US 8,884,491 B2

(12) United States Patent
Kusase

(10) Patent No.: US 8,884,491 B2
(45) Date of Patent: Nov. 11, 2014

(54) MULTI-GAP ELECTRIC ROTATING MACHINE WITH ONE-PIECE STATOR CORE

(75) Inventor: Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 390 days.

(21) Appl. No.: 13/252,259

(22) Filed: Oct. 4, 2011

(65) Prior Publication Data

US 2012/0080977 A1 Apr. 5, 2012

(30) Foreign Application Priority Data

Oct. 4, 2010 (JP) ................................. 2010-224741

(51) Int. Cl.
| | | |
|---|---|---|
| H02K 1/26 | (2006.01) | |
| H02K 21/12 | (2006.01) | |
| H02K 1/27 | (2006.01) | |
| H02K 21/22 | (2006.01) | |
| H02K 7/14 | (2006.01) | |
| H02K 21/24 | (2006.01) | |
| H02K 21/14 | (2006.01) | |

(52) U.S. Cl.
CPC ............ *H02K 21/24* (2013.01); *H02K 2201/03* (2013.01); *H02K 21/22* (2013.01); *H02K 7/14* (2013.01); *H02K 21/14* (2013.01)
USPC ................. 310/266; 310/156.26; 310/156.49; 310/156.51

(58) Field of Classification Search
CPC ............................... H02K 16/04; H02K 29/00
USPC ............... 310/154.2, 156.02, 156.26, 156.32, 310/156.34, 156.35, 216.007, 216.023, 310/216.026–216.039, 216.42, 216.055, 310/156.49, 156.51, 156.53
See application file for complete search history.

(56) References Cited

U.S. PATENT DOCUMENTS 5,670,837 A * 9/1997 Boutaghou et al. ............ 310/184
6,459,185 B1 * 10/2002 Ehrhart et al. ............ 310/156.45

(Continued)

FOREIGN PATENT DOCUMENTS

| CN | 1716729 | 1/2006 |
|---|---|---|
| CN | 101199103 | 6/2008 |

(Continued)

OTHER PUBLICATIONS

Office Action (7 pages) dated Oct. 22, 2013, issued in corresponding Chinese Application No. 201110305523.3 and English translation (10 pages).

(Continued)

*Primary Examiner* — Tran Nguyen
*Assistant Examiner* — Jose Gonzalez Quinones
(74) *Attorney, Agent, or Firm* — Nixon & Vanderhye, P.C.

(57) ABSTRACT

In a multi-gap electric rotating machine, a stator core has a radially outer portion, a radially inner portion and a connecting portion. The radially outer portion is located radially outside of a rotor core with a radially outer magnetic gap formed therebetween. The radially inner portion is located radially inside of the rotor core with a radially inner magnetic gap formed therebetween. The connecting portion radially extends to connect the radially outer and inner portions and is located on one axial side of the rotor core with an axial magnetic gap formed therebetween. A stator coil is formed of electric wires mounted on the stator core. Each of the electric wires has radially-outer in-slot portions, radially-inner in-slot portions and radially-intermediate in-slot portions, which are respectively received in slots of the radially outer portion, slots of the radially inner portion and slots of the connecting portion of the stator core.

12 Claims, 12 Drawing Sheets

(56) References Cited

U.S. PATENT DOCUMENTS

| | | | |
|---|---|---|---|
| 6,590,312 B1* | 7/2003 | Seguchi et al. | 310/266 |
| 6,819,026 B2* | 11/2004 | Narita et al. | 310/266 |
| 2003/0102764 A1* | 6/2003 | Kusase | 310/216 |
| 2005/0285474 A1* | 12/2005 | Kaneko | 310/266 |
| 2008/0169720 A1* | 7/2008 | Petek | 310/156.35 |
| 2009/0206693 A1* | 8/2009 | Calley et al. | 310/179 |
| 2009/0309442 A1* | 12/2009 | Qu et al. | 310/114 |

FOREIGN PATENT DOCUMENTS

| | | |
|---|---|---|
| EP | 1 612 912 | 1/2006 |
| JP | 6-70522 | 3/1994 |
| JP | 3758122 | 1/2006 |
| JP | 2007-282331 | 10/2007 |

OTHER PUBLICATIONS

Kusase, S. et al., U.S. Appl. No. 13/112,328, filed May 20, 2011.

* cited by examiner

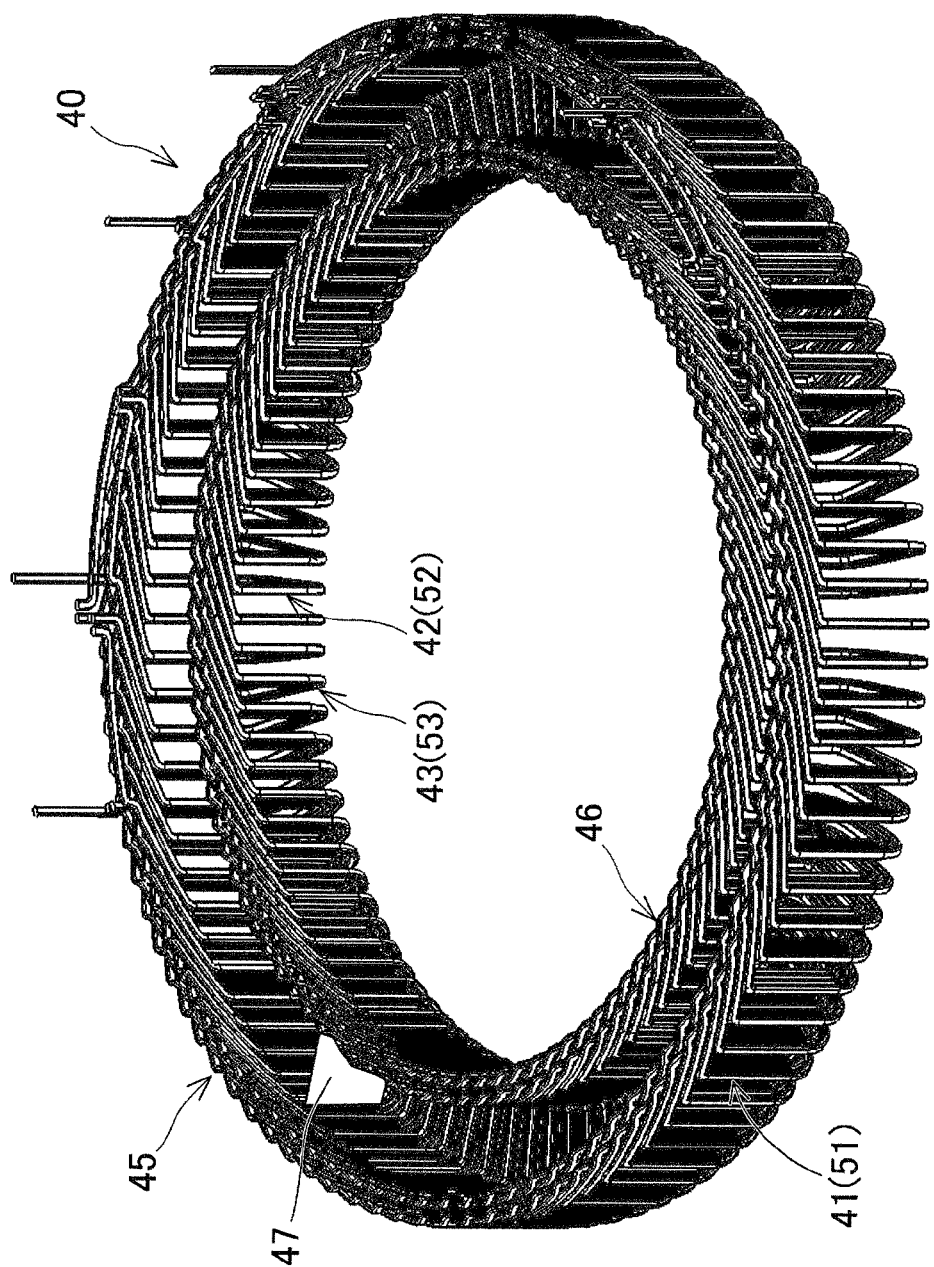

MULTI-GAP ELECTRIC ROTATING MACHINE WITH ONE-PIECE STATOR CORE

CROSS-REFERENCE TO RELATED APPLICATION

This application is based on and claims priority from Japanese Patent Application No. 2010-224741, filed on Oct. 4, 2010, the content of which is hereby incorporated by reference in its entirety into this application.

BACKGROUND OF THE INVENTION

1. Technical Field of the Invention

The present invention relates to multi-gap electric rotating machines which are used in, for example, motor vehicles as electric motors and electric generators.

2. Description of the Related Art

There are electric rotating machines which are used in a narrow space and thus required to be flat in shape, such as an engine direct-coupled motor that is arranged between an engine and a transmission in a hybrid vehicle and a motor for a household appliance (e.g., a washing machine). Further, as a method of increasing the output torque of those electric rotating machines, there is known a double-gap structure which includes a radially inner magnetic gap and a radially outer magnetic gap.

Moreover, as double-gap electric rotating machines, there are known 1 stator-2 rotor electric rotating machines and 1 rotor-2 stator electric rotating machines.

The 1 stator-2 rotor electric rotating machines include a stator and inner and outer rotors. The stator includes a stator core and a stator coil mounted on the stator core. The inner rotor is disposed radially inside of the stator so as to be surrounded by the stator with a radially inner magnetic gap formed therebetween. The outer rotor is disposed radially outside of the stator so as to surround the stator with a radially outer magnetic gap formed therebetween.

However, the 1 stator-2 rotor electric rotating machines involve the following problems. First, though there is provided only single stator, the number of turns of the stator coil is large. Secondly, both the inner and outer rotors are thin and wide in shape. Moreover, the inner rotor is exposed on the radially inner side while the outer rotor is exposed on the radially outer side. Consequently, both the inner and outer rotors may be easily deformed, thereby generating loud noise during operation. Thirdly, since the stator is radially interposed between two rotating objects, i.e., the inner and outer rotors, it is difficult to securely fix the stator in the electric rotating machine.

On the other hand, the 1 rotor-2 stator electric rotating machines include a rotor and inner and outer stators. The inner stator is disposed radially inside of the rotor while the outer stator is disposed radially outside of the rotor.

For example, FIG. 13 shows a 1 rotor-2 stator in-wheel motor for a vehicle, which is originally disclosed in Japanese Patent Application Publication No. 2007-282331. As shown in the figure, this motor includes a rotor 20A, an inner stator 31A disposed radially inside of the rotor 20A, and an outer stator 33A disposed radially outside of the rotor 20A. Consequently, the rotor 20A is radially interposed between the inner and outer rotors 31A and 33A, and thus exposed neither on the radially inner side nor on the radially outer side. Moreover, both the inner and outer stators 31A and 33A can be securely fixed in the motor.

With the above configuration, however, it is necessary to wind two stator coils respectively for the inner and outer stators 31A and 33A and separately fix the inner and outer stators 31A and 33A to the wheel frame. Consequently, the assembly process of the motor is complicated, and it is difficult to secure high concentricity of the inner and outer stators 31A and 33A.

To solve the above problem, one may consider employing a fixing member to connect and thereby fix the inner and outer stators 31A and 33A together. However, in this case, the fixing member will be located axially outside of coil ends of the stator coils of the inner and outer stators 31A and 33A, thus increasing the overall axial length of the motor. Consequently, the motor may become no longer flat in shape, and thus it may become difficult to mount the motor in the wheel.

SUMMARY OF THE INVENTION

According to the present invention, there is provided a multi-gap electric rotating machine which includes a rotor, a stator core and a stator coil. The rotor includes an annular rotor core. The stator core has a radially outer portion, a radially inner portion and a connecting portion. The radially outer portion has an annular shape and is located radially outside of the rotor core with a radially outer magnetic gap formed between the radially outer portion and the rotor core. The radially outer portion has a plurality of slots that are formed in the radially inner surface of the radially outer portion and spaced in the circumferential direction of the radially outer portion. The radially inner portion has an annular shape and is located radially inside of the rotor core with a radially inner magnetic gap formed between the radially inner portion and the rotor core. The radially inner portion has a plurality of slots that are formed in the radially outer surface of the radially inner portion and spaced in the circumferential direction of the radially inner portion. The connecting portion radially extends to connect the radially outer and inner portions. The connecting portion is located on one axial side of the rotor core with an axial magnetic gap formed between the connecting portion and the rotor core. The connecting portion has a plurality of slots each of which is formed in an axial end face of the connecting portion facing the rotor core so as to communicate with a corresponding pair of the slots of the radially outer and radially inner portions. The stator coil is formed of a plurality of electric wires mounted on the stator core. Each of the electric wires has a plurality of radially-outer in-slot portions, a plurality of radially-inner in-slot portions and a plurality of radially-intermediate in-slot portions. Each of the radially-outer in-slot portions is received in a corresponding one of the slots of the radially outer portion of the stator core. Each of the radially-inner in-slot portions is received in a corresponding one of the slots of the radially inner portion of the stator core. Each of the radially-intermediate in-slot portions is received in a corresponding one of the slots of the connecting portion of the stator core.

With the above configuration, the radially outer portion and the radially inner portion of the stator core are connected by the connecting portion, thereby imparting one-piece structure to the stator core. Consequently, it is possible to secure high concentricity of the radially outer portion and the radially inner portion. Moreover, it is unnecessary to arrange an additional connecting member for connecting the radially outer and inner portions axially outside of coil ends of the stator coil. Consequently, it is possible to minimize the overall axial length of the multi-gap electric rotating machine, thereby making the machine flat in shape. As a result, the multi-gap electric rotating machine can be suitably arranged in a narrow space.

Moreover, with the above configuration, the electric wires together make up the single stator coil. In other words, there is provided only one stator coil in the multi-gap electric rotating machine. Further, the stator coil is mounted to the one piece-structured stator core. Consequently, it is possible to simplify the assembly process of the multi-gap electric rotating machine, thereby improving the productivity.

Furthermore, with the above configuration, the rotor core and the stator core face each other through the radially outer magnetic gap, the radially inner magnetic gap and the axial magnetic gap therebetween. In other words, the number of the magnetic gaps formed between the rotor core and the stator core is equal to 3. Consequently, it is possible to increase the amount of magnetic flux transferred between the rotor core and the stator core, thereby improving the performance of the multi-gap electric rotating machine.

According to a further implementation of the invention, each of the rotor core and the stator core is made of a magnetic material.

The number of the slots of the radially outer portion of the stator core is equal to that of the slots of the radially inner portion of the stator core. Each of the slots of the radially outer portion is radially aligned with a corresponding one of the slots of the radially inner portion. Each of the slots of the connecting portion of the stator core radially extends so as to communicate with the corresponding pair of the slots of the radially outer and radially inner portions which are radially aligned with each other.

Each of the slots of the radially outer portion of the stator core axially extends so as to have an opening on an axial end face of the radially outer portion which is on the axially opposite side to the connecting portion of the stator core. Each of the slots of the radially inner portion of the stator core axially extends so as to have an opening on an axial end face of the radially inner portion which is on the axially opposite side to the connecting portion of the stator core. The electric wires forming the stator coil are mounted to the stator core by axially moving the electric wires toward the stator core from the opposite side to the connecting portion until the radially-outer in-slot portions, radially-inner in-slot portions and radially-intermediate in-slot portions of the electric wires are respectively inserted in the slots of the radially outer portion, the slots of the radially inner portion and the slots of the connecting portion of the stator core.

Each of the electric wires forming the stator coil further has a plurality of radially-outer turn portions and a plurality of radially-inner turn portions. Each of the radially-outer turn portions is located outside of the slots of the radially outer portion of the stator core and connects a corresponding adjacent pair of the radially-outer in-slot portions of the electric wire. Each of the radially-inner turn portions is located outside of the slots of the radially inner portion of the stator core and connects a corresponding adjacent pair of the radially-inner in-slot portions of the electric wire.

Each of the electric wires forming the stator coil has a rectangular cross section perpendicular to a longitudinal direction thereof.

Further, each of the radially-intermediate in-slot portions of the electric wires radially extends between the radially outer portion and radially inner portion of the stator core and is twisted at its radial center by 90°. In each of the slots of the radially outer portion of the stator core, a predetermined number of the radially-outer in-slot portions of the electric wires are radially stacked with the longer sides of cross sections thereof overlapping one another. On the other hand, in each of the slots of the radially inner portion of the stator core, a predetermined number of the radially-inner in-slot portions of the electric wires are radially stacked with the shorter sides of cross sections thereof overlapping one another.

In one embodiment of the invention, the multi-gap electric rotating machine is configured as an engine direct-coupled motor that is arranged between an engine and a transmission in a hybrid vehicle.

In another embodiment of the invention, the multi-gap electric rotating machine is configured as an in-wheel motor for an electric vehicle.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 7 is a perspective view of the stator coil of the stator;

DESCRIPTION OF PREFERRED EMBODIMENTS

Figure 1:
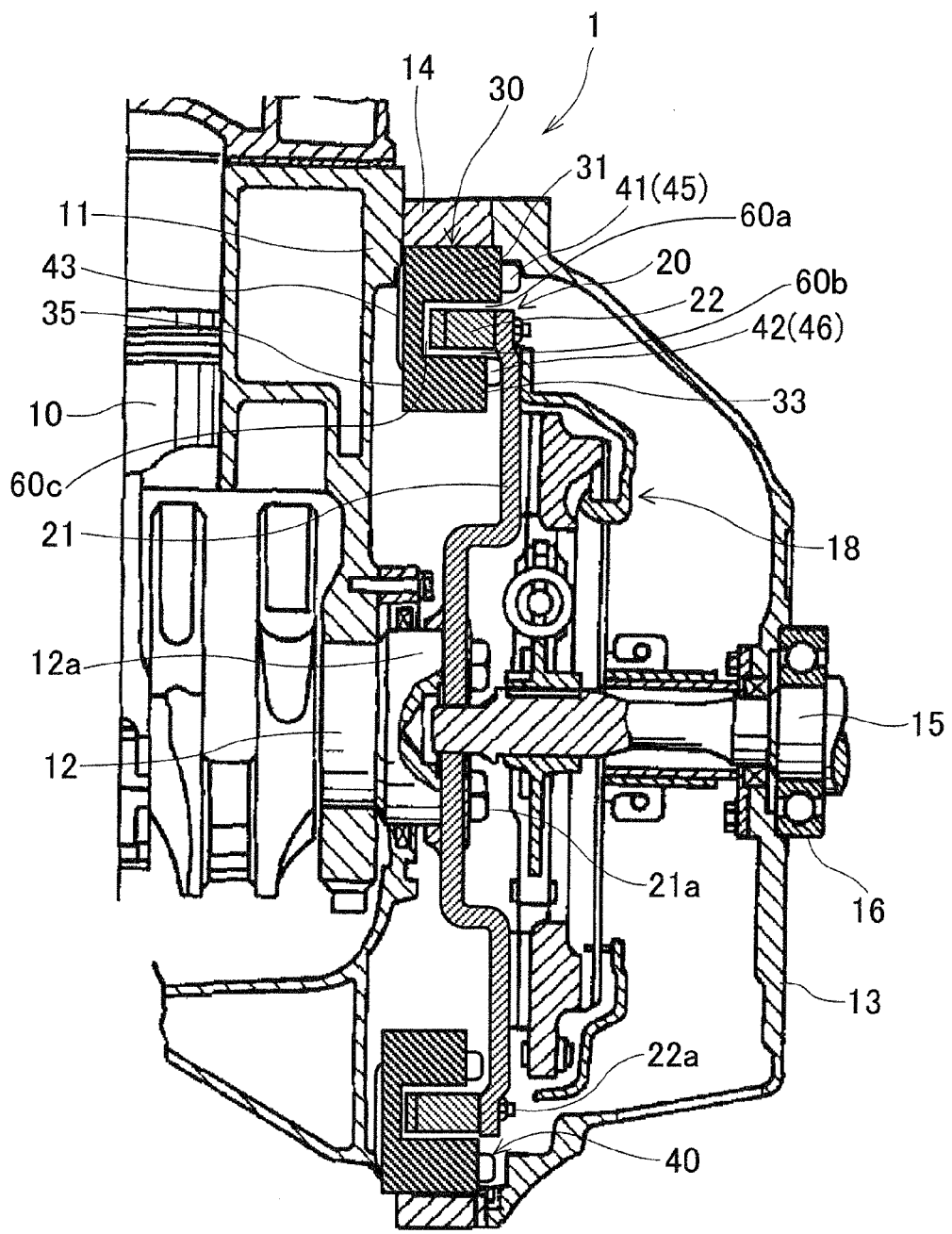
FIG. 1 is a schematic cross-sectional view of a multi-gap electric rotating machine according to a first embodiment of the invention.

Preferred embodiments of the present invention will be described hereinafter with reference to FIGS. 1-15. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

[First Embodiment]

FIG. 1 shows the overall configuration of a multi-gap electric rotating machine according to a first embodiment of the invention. In this embodiment, the multi-gap electric rotating machine is configured as an engine direct-coupled motor 1 for a hybrid vehicle.

Specifically, in FIG. 1, reference numeral 10 denotes an engine of the hybrid vehicle, which is fixed to an engine frame 11. Reference numeral 12 denotes a crankshaft (or an output shaft) of the engine 10. To one end (i.e., the right end in FIG. 1) of the engine frame 11, there is fixed an opening end portion of a substantially cup-shaped housing 13 via a tubular housing 14. At a center portion of a bottom wall of the cup-shaped housing 13, there is rotatably supported a transmission shaft 15 by a bearing 16. The transmission shaft 15 extends into the housing 13 and is coaxially arranged with the crankshaft 12 of the engine 10.

Figure 2:
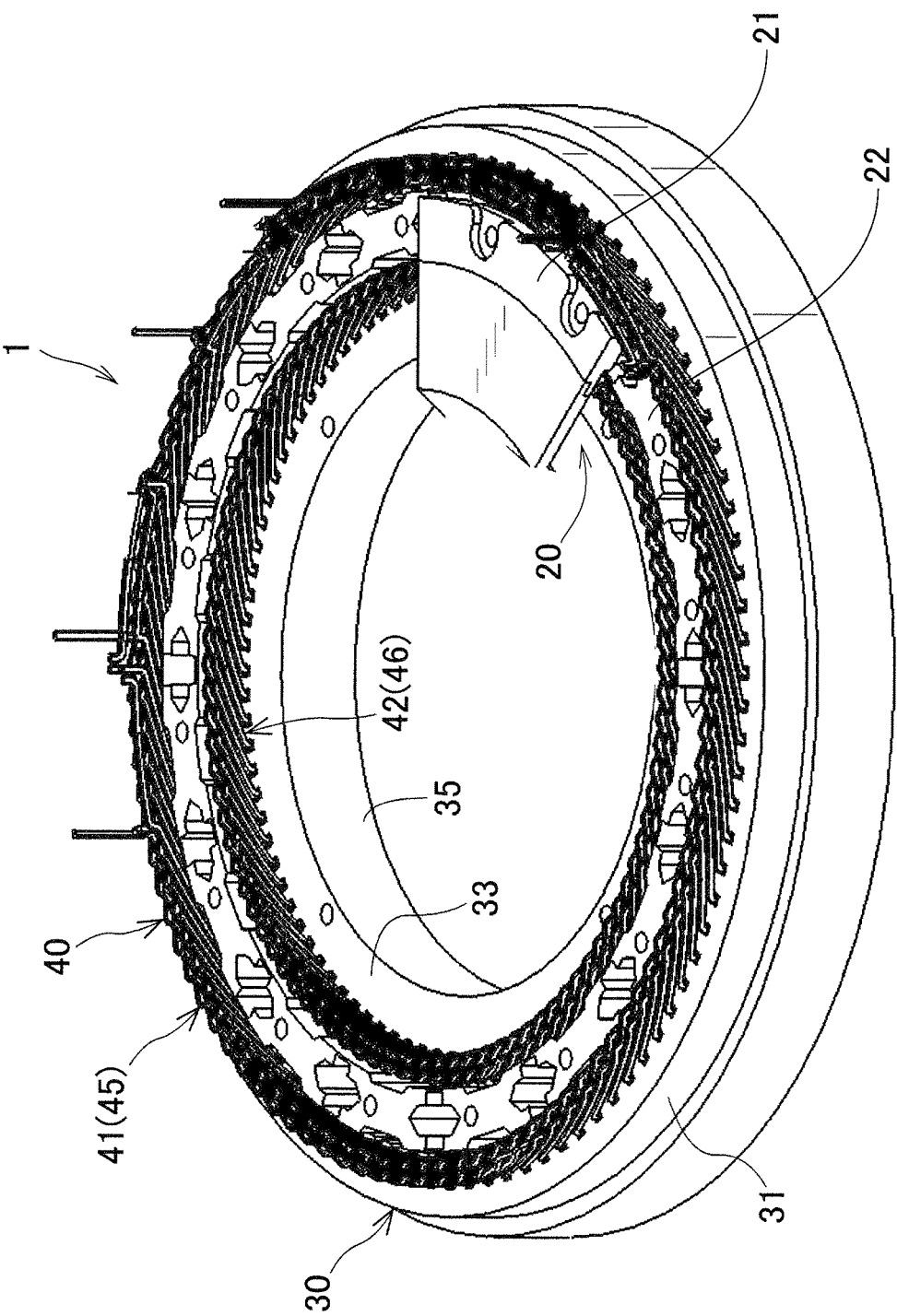
FIG. 2 is a perspective view of an assembly of a rotor and a stator of the multi-gap electric rotating machine, wherein only part of a rotor disc of the rotor is shown.

The motor 1 is arranged within the tubular housing 14. As shown in FIGS. 1 and 2, the motor 1 includes a rotor 20 and a stator that is comprised of a stator core 30 and a three-phase stator coil 40 mounted on the stator core 30.

The rotor 20 includes a rotor disc 21 and an annular rotor core 22 that is fixed to a radially outer end portion of the rotor disc 21 by means of bolts 22a. A radially center portion of the rotor disc 21 is fixed, by means of bolts 21a, to a shaft hub 12a that is formed at one end (i.e., the right end in FIG. 1) of the crankshaft 12. Consequently, the rotor 20 can rotate with the crankshaft 12.

Figure 3:
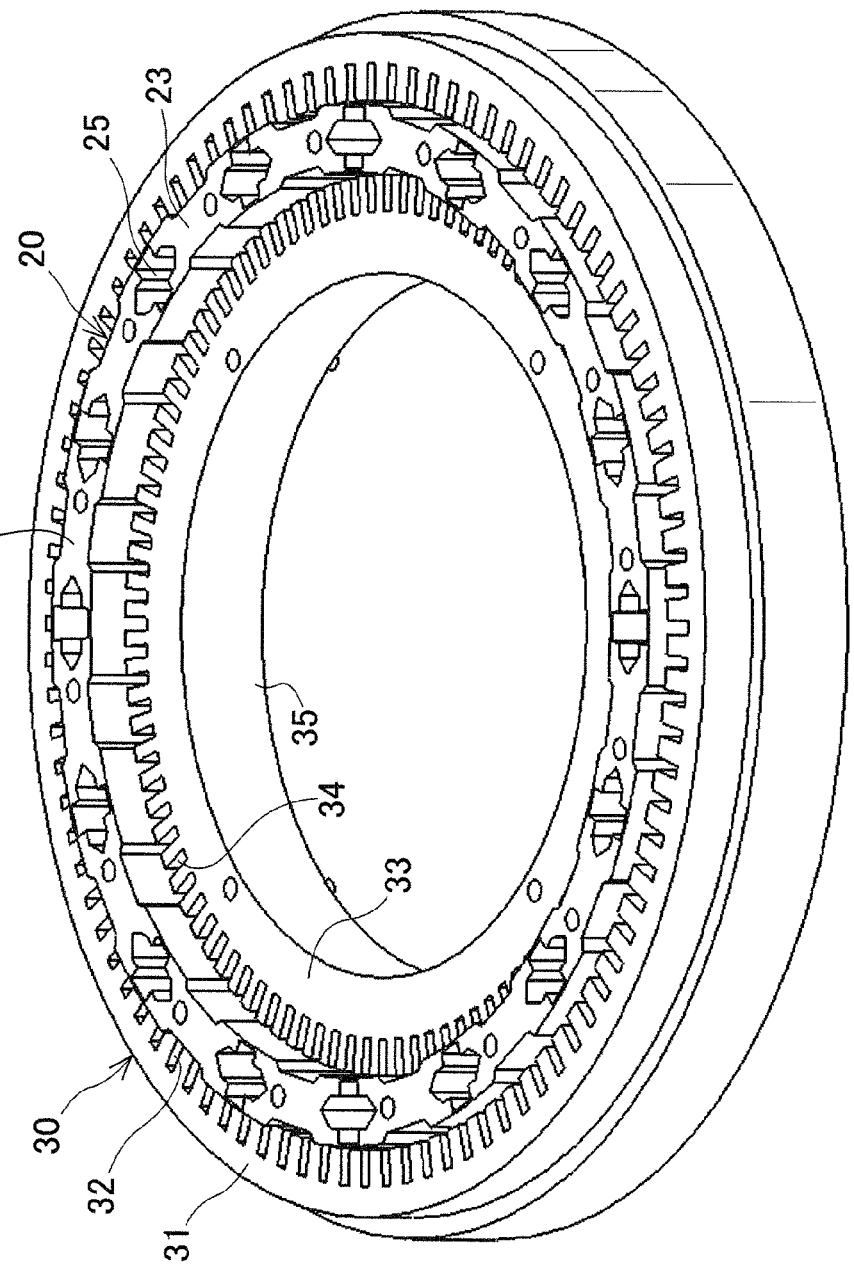
FIG. 3 is a perspective view of the assembly omitting the rotor disc and a stator coil of the stator.
Figure 4:
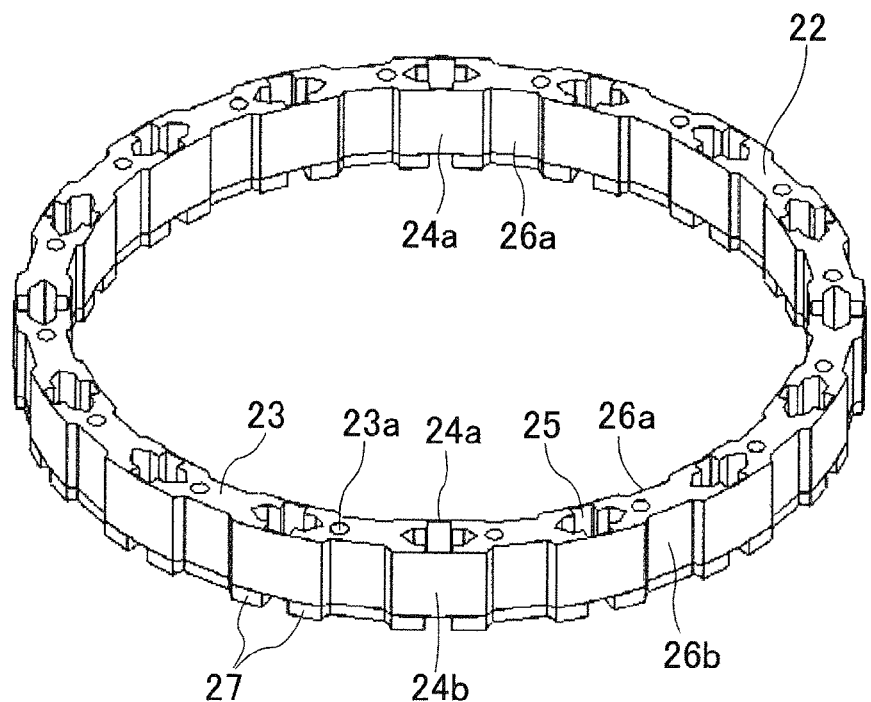
FIG. 4 is a perspective view of a rotor core of the rotor.

Referring to FIGS. 3 and 4, the rotor core 22 includes a plurality of (e.g., 16 in the present embodiment) magnetic pole portions 23, a plurality of radially inner bridge portions 24a and a plurality of radially outer bridge portions 24b. The magnetic pole portions 23 are connected to one another in the circumferential direction of the rotor core 22 by corresponding pairs of the radially inner and outer bridge portions 24a and 24b. Further, between each corresponding pair of the radially inner and outer bridge portions 24a and 24b, there is formed a hollow space 25 for blocking magnetic flux. In addition, in the present embodiment, the rotor core 22 is formed by laminating a plurality of magnetic steel sheets.

Each of the magnetic pole portions 23 of the rotor core 22 is formed so as to be radially thinner at its circumferential center than at its circumferential ends. Consequently, on the radially inner surface of the rotor core 22, the radially inner bridge portions 24a and a plurality of recesses 26a alternate in the circumferential direction of the rotor core 22; the radially inner bridge portions 24a protrude radially inward while the recesses 26a are recessed radially outward. On the other hand, on the radially outer surface of the rotor core 22, the radially outer bridge portions 24b and a plurality of recesses 26b alternate in the circumferential direction of the rotor core 22; the radially outer bridge portions 24b protrude radially outward while the recesses 26b are recessed radially inward.

Further, in each of the magnetic pole portions 23 of the rotor core 22, there is formed a threaded through-hole 23a which extends in the axial direction of the rotor core 22 and through which one of the bolts 22a extends for fixing the rotor core 22 to the rotor disc 21.

Furthermore, as shown in FIG. 4, each of the magnetic pole portions 23 of the rotor core 22 has a magnetic pole piece 27 mounted on one end face (i.e., the lower end face in FIG. 4) thereof. The magnetic pole piece 27 is made of a magnetic material.

Figure 5A:
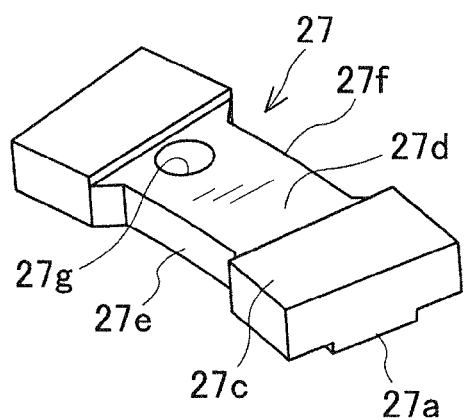
FIG. 5A is a perspective view of a magnetic pole piece of the rotor from the front side.
Figure 5B:
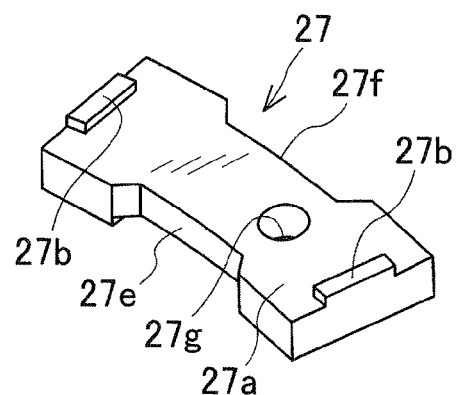
FIG. 5B is a perspective view of the magnetic pole piece from the back side.

The magnetic pole piece 27 has, as shown in FIG. 5B, a pair of protrusions 27b that are respectively formed at opposite circumferential ends on a back face 27a (i.e., the end face facing the magnetic pole portion 23) of the magnetic pole piece 27. The protrusions 27b are respectively fitted into a pair of recesses (not shown) formed in the end face of the magnetic pole portion 23, thereby positioning the magnetic pole piece 27 with respect to the magnetic pole portion 23. Moreover, as shown in FIG. 5A, the magnetic pole piece 27 further has a recess 27d that is formed at a circumferential center portion in a front face 27c of the magnetic pole piece 27. Furthermore, the magnetic pole piece 27 also has a recess 27e that is formed at a circumferential center portion in a radially inner surface of the magnetic pole piece 27 and a recess 27f that is formed at a circumferential center portion in a radially outer surface of the magnetic pole piece 27. The recesses 27e and 27f of the magnetic pole piece 27 respectively correspond to the recesses 26a and 26b of the magnetic pole portion 23. In addition, in the magnetic pole piece 27, there is formed a threaded through-hole 27g that extends in the axial direction of the rotor core 22 and is positioned so as to communicate with the threaded through-hole 23a of the magnetic pole portion 23. The magnetic pole piece 27 is fixed, together with the magnetic pole portion 23, to the rotor disc 21 by fastening the bolt 22a into the threaded through-hole 23a of the magnetic pole portion 23 and the threaded through-hole 27g of the magnetic pole piece 27.

Referring back to FIG. 1, in the present embodiment, the motor 1 further includes a clutch mechanism 18 that is arranged within the housing 13 around the transmission shaft 15. The clutch mechanism 18 functions to selectively allow and prohibit transmission of torque from the crankshaft 12 to the transmission shaft 15 via the rotor 20.

The stator core 30 has, as shown in FIGS. 1-3 and 6A-6C, a radially outer portion 31, a radially inner portion 33, and a connecting portion 35 that connects the radially inner and outer portions 31 and 33.

The radially outer portion 31 of the stator core 30 has an annular shape and is formed of a plurality of magnetic steel sheets that are laminated in the axial direction of the radially outer portion 31. The radially outer portion 31 is arranged coaxially with and radially outside of the rotor core 22, forming a radially outer magnetic gap 60a between the radially outer portion 31 and the rotor core 22. Moreover, the radially outer portion 31 has a plurality of slots 32 formed in the radially inner surface thereof; the radially inner surface radially faces the rotor core 22. Each of the slots 32 extends in the axial direction of the radially outer portion 31 so as to penetrate the radially outer portion 31. Further, the slots 32 are spaced in the circumferential direction of the radially outer portion 31 at equal intervals. For each of the slots 32, the depth-wise direction of the slot 32 is coincident with a radial direction of the radially outer portion 31. In the present embodiment, there are provided two slots 32 per magnetic pole of the rotor 20 that has 16 magnetic poles and per phase of the three-phase stator coil 40. Accordingly, the total number of the slots 32 provided in the radially outer portion 31 of the stator core 30 is equal to 96 (i.e., 2×16×3).

The radially inner portion 33 of the stator core 30 also has an annular shape and is formed of a plurality of magnetic steel sheets that are laminated in the axial direction of the radially inner portion 33. The radially inner portion 33 is arranged coaxially with and radially inside of the rotor core 22, forming a radially inner magnetic gap 60b between the radially inner portion 33 and the rotor core 22. Moreover, the radially inner portion 33 has a plurality of slots 34 formed in the radially outer surface thereof; the radially outer surface radially faces the rotor core 22. Each of the slots 34 extends in the axial direction of the radially inner portion 33 so as to penetrate the radially inner portion 33. Further, the slots 34 are spaced in the circumferential direction of the radially inner portion 33 at equal intervals. For each of the slots 34, the depth-wise direction of the slot 34 is coincident with a radial direction of the radially inner portion 33. In the present embodiment, the number of the slots 34 formed in the radially inner portion 33 is equal to that of the slots 32 formed in the radially outer portion 31 (i.e., equal to 96). Furthermore, each of the slots 34 is radially aligned with a corresponding one of the slots 32.

In addition, in the present embodiment, the radial depth of the slots 34 formed in the radially inner portion 33 of the stator core 30 is set to be greater than that of the slots 32 formed in the radially outer portion 31 by a predetermined value. On the other hand, the circumferential width of the slots 34 is set to be less than that of the slots 32. Consequently, the circumferential width of teeth of the radially inner portion 33 is increased, thereby improving the performance of the motor 1. Here, the teeth of the radially inner portion 33 radially extend so as to define the slots 34 therebetween.

The connecting portion 35 of the stator core 30 also has an annular shape and is formed of a plurality of magnetic steel sheets that are laminated in the axial direction of the connecting portion 35. The connecting portion 35 has its radially outer part joined to one axial end face (i.e., the left end face in FIG. 6B) of the radially outer portion 31 of the stator core 30 and its radially inner part joined to one axial end face (i.e., the left end face in FIG. 6B) of the radially inner portion 33 of the stator core 30. Consequently, the radially outer portion 31 and the radially inner portion 33 are connected by the connecting portion 35. The connecting portion 35 is arranged on one axial side (i.e., the left side in FIG. 1) of the rotor core 22, forming an axial magnetic gap 60c between the connecting portion 35 and an axial end face (i.e., the left end face in FIG. 1) of the rotor core 22. The connecting portion 35 has a plurality of (e.g., 96 in the present embodiment) slots 36 formed therein. Each of the slots 36 axially extends so as to penetrate the connecting portion 35. Further, each of the slots 36 radially extends so as to communicate with a radially-aligned pair of the slots 32 and 34 of the radially outer and inner portions 31 and 33. In addition, it should be noted that each of the slots 36 may also be formed not to axially penetrate the connecting portion 35 and to have a bottom on the axially opposite side to the rotor core 22.

As above, in the present embodiment, the stator core 30 includes the three integral parts, i.e., the radially outer portion 31, the radially inner portion 33, and the connecting portion 35 that connects the radially inner and outer portions 31 and 33. The stator core 30 is disposed with respect to the rotor core 22 so as to define three magnetic gaps, i.e., the radially outer magnetic gap 60a between the radially outer portion 31 and the rotor core 22, the radially inner magnetic gap 60b between the radially inner portion 33 and the rotor core 22, and the axial magnetic gap 60c between the connecting portion 35 and the rotor core 22.

The stator coil 40 is formed of a plurality of electric wires 50 mounted on the stator core 30. The electric wires 50 are assembled together so that the stator coil 40 has, as shown in FIG. 7, the shape of a ring that has a substantially "U"-shaped cross section perpendicular to the circumferential direction thereof.

Specifically, the stator coil 40 includes three parts, i.e., a radially outer part 41 mounted on the radially outer portion 31 of the stator core 30, a radially inner part 42 mounted on the radially inner portion 33 of the stator core 30, and a radially intermediate part 43 mounted on the connecting portion 35 of the stator core 30. Moreover, between the three parts 41, 42 and 43, there is formed an annular hollow space 47 that has a cross section denoted with white color in FIG. 7. In addition, the rotor core 22 is received and rotates within the annular hollow space 47.

Figure 8:
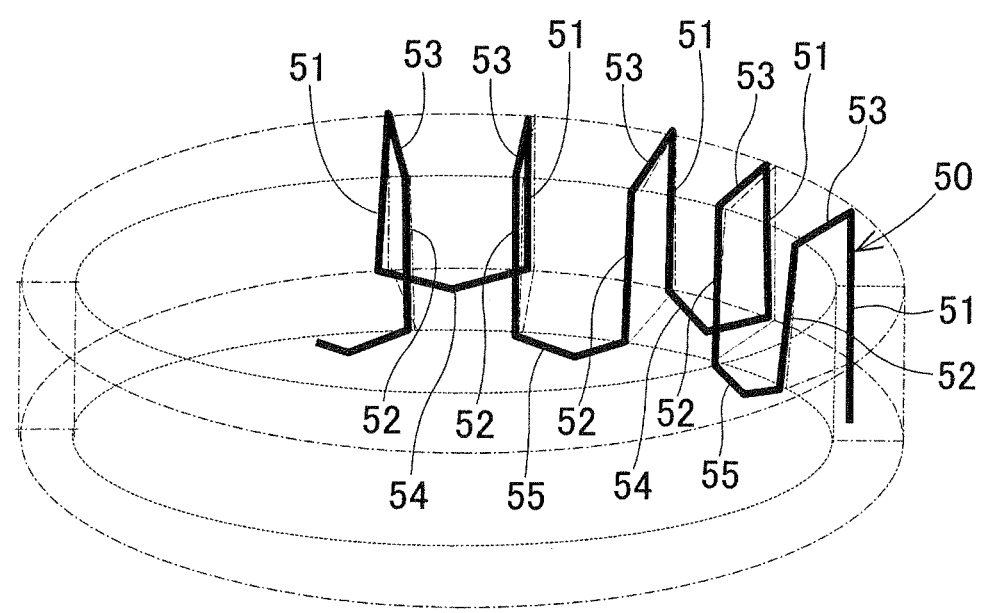
FIG. 8 is a perspective view of one of the electric wires which together make up the stator coil.

Referring to FIG. 8, each of the electric wires 50 has a plurality of radially-outer in-slot portions 51, a plurality of radially-inner in-slot portions 52, a plurality of radially-intermediate in-slot portions 53, a plurality of radially-outer turn portions 54, and a plurality of radially-inner turn portions 55. Each of the radially-outer in-slot portions 51 is received in a corresponding one of the slots 32 of the radially outer portion 31 of the stator core 30. Each of the radially-inner in-slot portions 52 is received in a corresponding one of the slots 34 of the radially inner portion 33 of the stator core 30. Each of the radially-intermediate in-slot portions 53 is received in a corresponding one of the slots 36 of the connecting portion 35 of the stator core 30. Each of the radially-outer turn portions 54 is located outside of the slots 32 of the radially outer portion 31 of the stator core 30 and connects a corresponding adjacent pair of the radially-outer in-slot portions 51 of the electric wire 50. Each of the radially-inner turn portions 55 is located outside of the slots 34 of the radially inner portion 33 of the stator core 30 and connects a corresponding adjacent pair of the radially-inner in-slot portions 52 of the electric wire 50.

Figure 9:
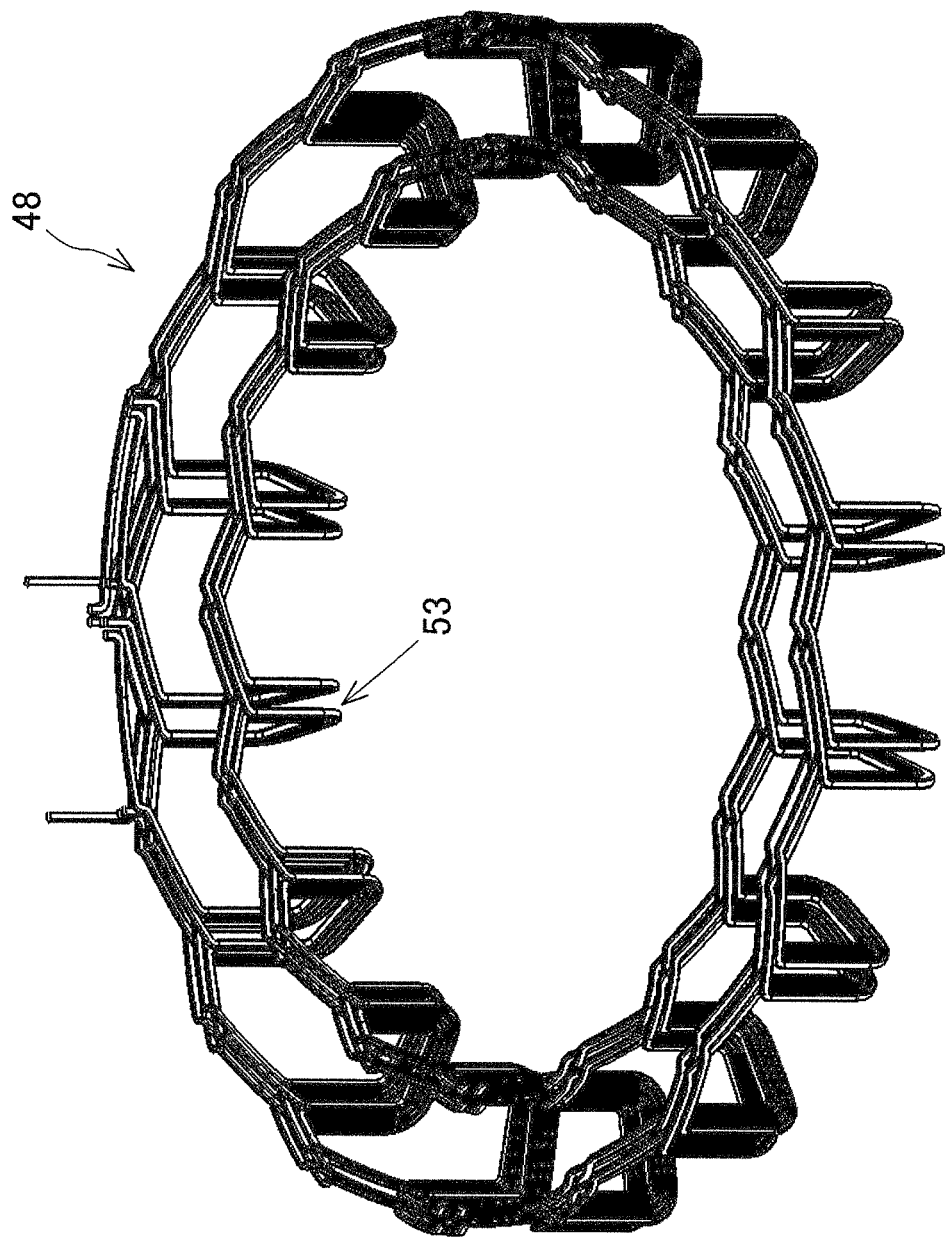
FIG. 9 is a perspective view of one of the phase windings of the stator coil.

Moreover, in the present embodiment, the stator coil 40 is configured as a three-phase stator coil which includes U-phase, V-phase and W-phase windings 48. Each of the U-phase, V-phase and W-phase windings 48 is formed by connecting a predetermined number of the electric wires 50 to have an annular shape as shown in FIG. 9.

For each of the electric wires 50, the radially-outer in-slot portions 51 of the electric wire 50 are respectively received in the corresponding slots 32 of the radially outer portion 31 of the stator core 30; the corresponding slots 32 are circumferentially spaced at a pitch of six slots 32 which corresponds to one magnetic pole pitch (or an electrical angle of $\pi$). The radially-inner in-slot portions 52 of the electric wire 50 are respectively received in the corresponding slots 34 of the radially inner portion 33 of the stator core 30; the corresponding slots 34 are circumferentially spaced at a pitch of six slots 34 which corresponds to one magnetic pole pitch. The radially-intermediate in-slot portions 53 of the electric wire 50 are respectively received in the corresponding slots 36 of the connecting portion 35 of the stator core 30; the corresponding slots 36 are circumferentially spaced at a pitch of six slots 36 which corresponds to one magnetic pole pitch.

Further, in each of the slots 32 of the radially outer portion 31 of the stator core 30, there are received four radially-outer in-slot portions 51 of the electric wires 50 forming the same phase winding of the stator coil 40. In each of the slots 34 of the radially inner portion 33 of the stator core 30, there are received four radially-inner in-slot portions 52 of the electric wire 50 forming the same phase winding of the stator coil 40. In each of the slots 36 of the connecting portion 35 of the stator core 30, there are received four radially-intermediate in-slot portions 53 of the electric wires 50 forming the same phase winding of the stator coil 40.

Furthermore, in the present embodiment, each of the radially-intermediate in-slot portions 53 of the electric wires 50 forming the stator coil 40 radially extends between the radially outer portion 31 and radially inner portion 33 of the stator core 30 and is twisted at its radial center by 90°. Consequently, in each of the slots 32 of the radially outer portion 31 of the stator core 30, the four radially-outer in-slot portions 51 of the electric wires 50 are radially stacked with the longer sides of cross sections of the in-slot portions 51 overlapping one another. On the other hand, in each of the slots 34 of the radially inner portion 33 of the stator core 30, the four radially-inner in-slot portions 52 of the electric wire 50 are radially stacked with the shorter sides of cross sections of the in-slot portions 52 overlapping one another.

Figure 6A:
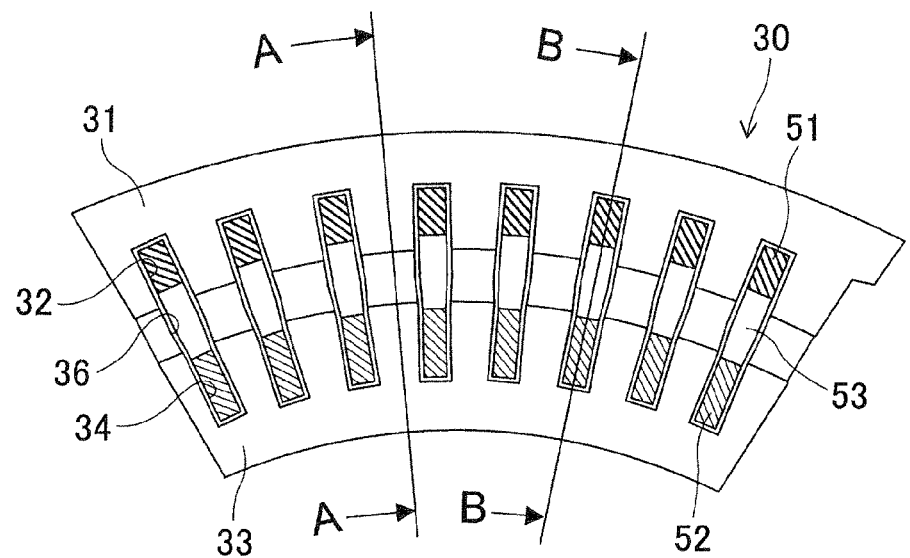
FIG. 6A is a plan view of part of the stator.
Figure 6B:
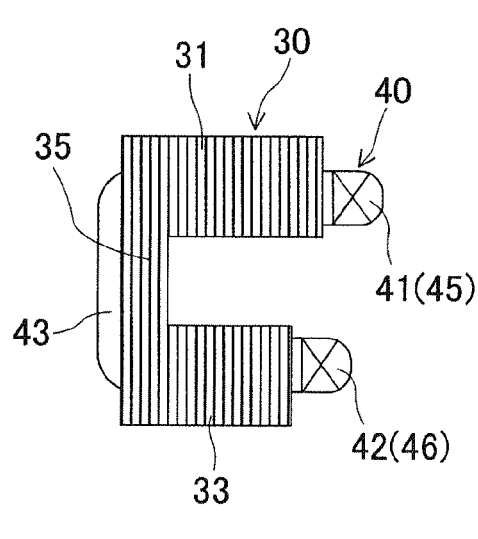
FIG. 6B is a cross-sectional view taken along the line A-A in FIG. 6A.
Figure 6C:
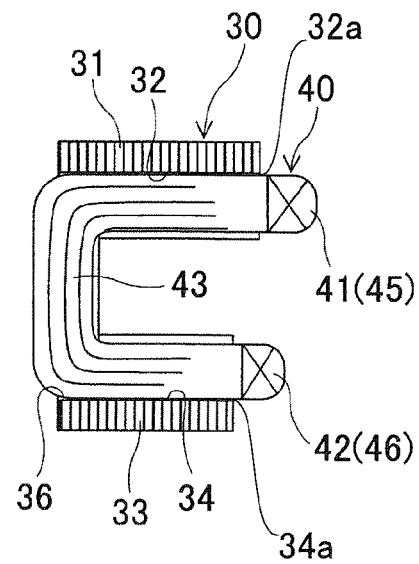
FIG. 6C is a cross-sectional view taken along the line B-B in FIG. 6A.

Moreover, referring to FIG. 6C, in the present embodiment, each of the slots 32 axially penetrate the radially outer portion 31 of the stator core 30 to have an opening 32a on that axial end face of the radially outer portion 31 which is on the axially opposite side to the connecting portion 35 of the stator core 30. Each of the slots 34 axially penetrate the radially inner portion 33 of the stator core 30 to have an opening 34a on that axial end face of the radially inner portion 33 which on the axially opposite side to the connecting portion 35. In assembling the stator, the stator coil 40 is axially moved toward the stator core 30 from the opposite side to the connecting portion 35 of the stator core 30, until the radially-outer in-slot portions 51, radially-inner in-slot portions 52 and radially-intermediate in-slot portions 53 of the electric wires 50 forming the stator coil 40 are respectively inserted in the slots 32, slots 34 and slots 36 of the radially outer portion 31, radially inner portion 33 and connecting portion 35 of the stator core 30.

In addition, in the present embodiment, as shown in FIGS. 7 and 9, the radially-intermediate in-slot portions 53 each radially extend and the stator coil 40 has no bridging portions which extend in the circumferential direction of the stator coil 40 to bridge the radially-intermediate in-slot portions 53. Consequently, the stator coil 40 can be easily assembled to the stator core 30 by axially inserting the radially-outer in-slot portions 51, radially-inner in-slot portions 52 and radially-intermediate in-slot portions 53 of the electric wires 50 forming the stator coil 40 respectively into the slots 32, slots 34 and slots 36 of the radially outer portion 31, radially inner portion 33 and connecting portion 35 of the stator core 30.

Figure 10:
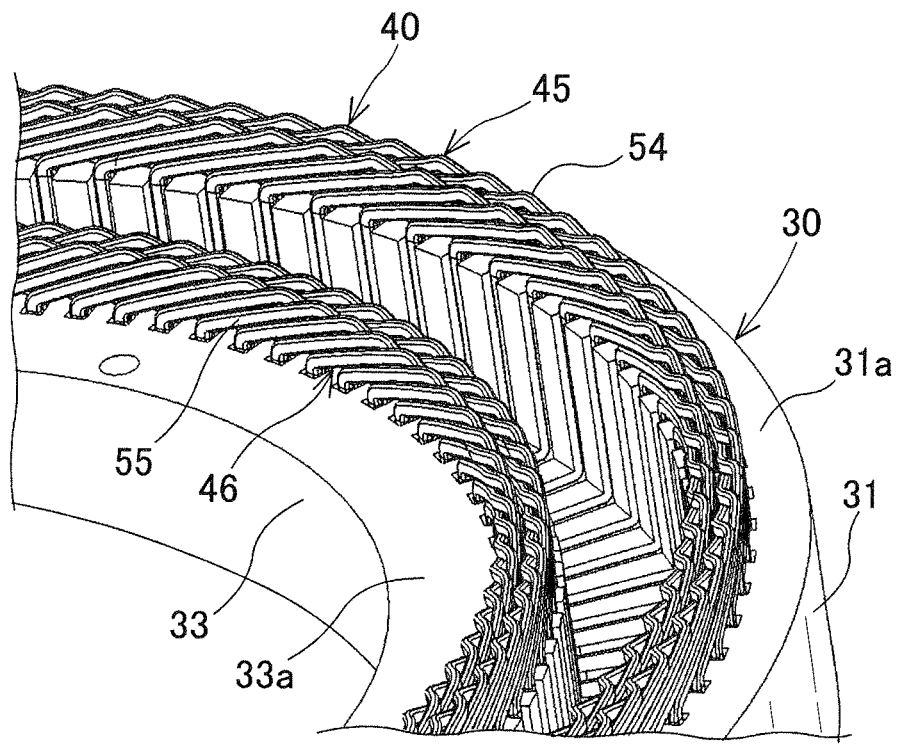
FIG. 10 is a perspective view of part of the stator.

As a result, as shown in FIG. 10, on the non-connecting portion 35 side of the stator core 30, the radially-outer turn portions 54 of the electric wires 50 forming the stator coil 40 protrude from the axial end face 31a of the radially outer portion 31 of the stator core 30, forming a radially outer end portion (or a radially outer coil end) 45 of the stator coil 40. The radially-inner turn portions 55 of the electric wires 50 forming the stator coil 40 protrude from the axial end face 33a of the radially inner portion 33 of the stator core 30, forming a radially inner end portion (or a radially inner coil end) 46 of the stator coil 40.

Figure 11:
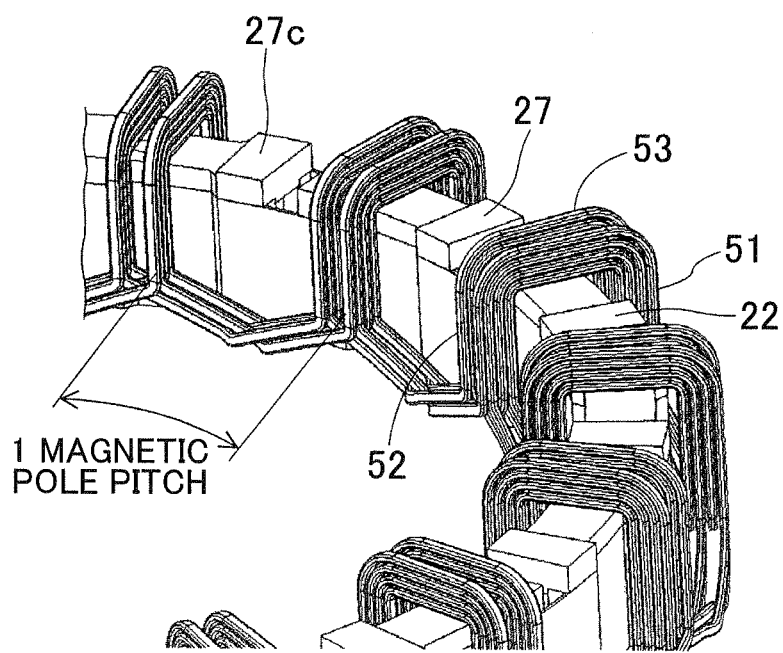
FIG. 11 is a perspective view illustrating the positional relationship between the stator coil of the stator and the rotor.

Moreover, as illustrated in FIG. 11, after the stator is assembled with the rotor 20, the radially-outer in-slot portions 51 of the electric wires 50 forming the stator coil 40 face the radially outer surface of the rotor core 22. The radially-inner in-slot portions 52 of the electric wires 50 face the radially inner surface of the rotor core 22. The radially-intermediate in-slot portions 53 of the electric wires 50 face that axial end face of the rotor core 22 which is composed of the front faces 27c of the magnetic pole pieces 27 of the rotor core 22.

In operation of the motor 1, the rotor 20 is rotated upon excitation of the stator by supply of three-phase AC power from an inverter (not shown) to the stator coil 40. Then, the crankshaft 12 is driven by the rotor 20 to rotate therewith, thereby starting the engine 10. In addition, during the starting of the engine 10, the clutch mechanism 18 prohibits transmission of torque from the crankshaft 12 to the transmission shaft 15. However, after the starting of the engine 10, the clutch mechanism 10 allows transmission of torque from the crankshaft 12 to the transmission shaft 15.

The above-described motor 1 according to the present embodiment has the following advantages.

In the present embodiment, the motor 1 includes the rotor 20, the stator core 30 and the stator coil 40. The rotor 20 includes the annular rotor core 22. The stator core 30 has the radially outer portion 31, the radially inner portion 33 and the connecting portion 35. The radially outer portion 31 has an annular shape and is located radially outside of the rotor core 22 with the radially outer magnetic gap 60a formed therebetween. The radially outer portion 31 has the slots 33 that are formed in the radially inner surface of the radially outer portion 31 and spaced in the circumferential direction of the radially outer portion 31. The radially inner portion 33 has an annular shape and is located radially inside of the rotor core 22 with the radially inner magnetic gap 60b formed therebetween. The radially inner portion 33 has the slots 34 that are formed in the radially outer surface of the radially inner portion 33 and spaced in the circumferential direction of the radially inner portion 33. The connecting portion 35 radially extends to connect the radially outer and inner portions 31 and 33. The connecting portion 35 is located on one axial side of the rotor core 22 with the axial magnetic gap 60c formed therebetween. The connecting portion 35 has the slots 36 each of which is formed, in that axial end face of the connecting portion 35 which faces the rotor core 22, so as to communicate with a corresponding pair of the slots 32 and 34 of the radially outer and radially inner portions 31 and 33. The stator coil 40 is formed of the electric wires 50 mounted on the stator core 30. Each of the electric wires 50 has the radially-outer in-slot portions 51, the radially-inner in-slot portions 52 and the radially-intermediate in-slot portions 53. Each of the radially-outer in-slot portions 51 is received in a corresponding one of the slots 32 of the radially outer portion 31 of the stator core 30. Each of the radially-inner in-slot portions 52 is received in a corresponding one of the slots 34 of the radially inner portion 33 of the stator core 30. Each of the radially-intermediate in-slot portions 53 is received in a corresponding one of the slots 36 of the connecting portion 35 of the stator core 30.

With the above configuration, the radially outer portion 31 and the radially inner portion 32 of the stator core 30 are connected by the connecting portion 35, thereby imparting one-piece structure to the stator core 30. Consequently, it is possible to secure high concentricity of the radially outer portion 31 and the radially inner portion 32. Moreover, it is unnecessary to arrange an additional connecting member for connecting the radially outer and inner portions 31 and 33 axially outside of the end portions 45 and 46 of the stator coil 40. Consequently, it is possible to minimize the overall axial length of the motor 1, thereby making the motor 1 flat in shape. As a result, the motor 1 can be suitably arranged in the narrow space between the engine 10 and the transmission of the hybrid vehicle.

Moreover, with the above configuration, the electric wires 50 together make up the single stator coil 40. In other words, there is provided only one stator coil in the motor 1. Further, the stator coil 40 is mounted to the one piece-structured stator core 30. Consequently, it is possible to simplify the assembly process of the motor 1, thereby improving the productivity.

Furthermore, with the above configuration, the rotor core 20 and the stator core 30 face each other through the radially outer magnetic gap 60a, the radially inner magnetic gap 60b and the axial magnetic gap 60c formed therebetween. In other words, the number of the magnetic gaps formed between the rotor core 20 and the stator core 30 is equal to 3. Consequently, it is possible to increase the amount of magnetic flux transferred between the rotor 20 and the stator, thereby improving the performance of the motor 1.

In the present embodiment, the number of the slots 32 of the radially outer portion 31 of the stator core 30 is equal to that of the slots 34 of the radially inner portion 33 of the stator core 30. Each of the slots 32 of the radially outer portion 31 is radially aligned with a corresponding one of the slots 34 of the radially inner portion 33. Each of the slots 36 of the connecting portion 35 of the stator core 30 radially extends so as to communicate with the corresponding pair of the slots 32 and 34 of the radially outer and radially inner portions 31 and 33 which are radially aligned with each other.

With the above configuration, it is possible to further increase the amount of magnetic flux transferred between the rotor 20 and the stator, thereby further improving the performance of the motor 1.

Further, in the present embodiment, each of the slots 32 of the radially outer portion 31 of the stator core 30 axially extends so as to have the opening 32a on that axial end face of the radially outer portion 31 which is on the axially opposite side to the connecting portion 35 of the stator core 30. Each of the slots 34 of the radially inner portion 33 of the stator core 30 axially extends so as to have the opening 34a on that axial end face of the radially inner portion 33 which is on the axially opposite side to the connecting portion 35 of the stator core 30. The electric wires 50 forming the stator coil 40 are mounted to the stator core 30 by axially moving the electric wires 50 toward the stator core 30 from the opposite side to the connecting portion 35 until the radially-outer in-slot portions 51, radially-inner in-slot portions 52 and radially-intermediate in-slot portions 53 of the electric wires 50 are respectively inserted in the slots 32, 34 and 36 of the radially outer portion 31, radially inner portion 33 and connecting portion 35 of the stator core 30.

With the above configuration, it is possible to easily assemble the stator core 30 and the stator coil 40 together. In other words, it is possible to significantly simplify the mounting of the stator coil 40 to the stator core 30. Moreover, it is possible to form the stator core 30 and the stator coil 40 separately; therefore, it is possible to easily and efficiently form each of the stator core 30 and the stator coil 40 at high accuracy. As a result, it is possible to secure low cost and high quality of the stator.

In the present embodiment, each of the electric wires 50 has the radially-outer turn portions 54 and the radially-inner turn portions 55 in addition to the radially-outer in-slot portions 51, the radially-inner in-slot portions 52 and the radially-intermediate in-slot portions 53. Each of the radially-outer turn portions 54 is located outside of the slots 32 of the radially outer portion 31 of the stator core 30 and connects a corresponding adjacent pair of the radially-outer in-slot portions 51 of the electric wire 50. Each of the radially-inner turn portions 55 is located outside of the slots 34 of the radially inner portion 33 of the stator core 30 and connects a corresponding adjacent pair of the radially-inner in-slot portions 52 of the electric wire 50.

With the above configuration, it is possible to first form the electric wires 50 separately and then assemble them in a predetermined manner to make up the stator coil 40 which can be easily mounted to the stator core 30.

In the present embodiment, each of the electric wires 50 forming the stator coil 40 has a rectangular cross section perpendicular to the longitudinal direction thereof.

With the above configuration, it is possible to secure high space factors of the electric wires 50 in the slots 32, 34 and 36 of the stator core 30.

In the present embodiment, each of the radially-intermediate in-slot portions 53 of the electric wires 50 forming the stator coil 40 radially extends between the radially outer portion 31 and radially inner portion 33 of the stator core 30 and is twisted at its radial center by 90°. In each of the slots 32 of the radially outer portion 31 of the stator core 30, a predetermined number of (e.g., 4 in the present embodiment) the radially-outer in-slot portions 51 of the electric wires 50 are radially stacked with the longer sides of cross sections thereof overlapping one another. In each of the slots 34 of the radially inner portion 33 of the stator core 30, a predetermined number of (e.g., 4 in the present embodiment) the radially-inner in-slot portions 52 of the electric wires 50 are radially stacked with the shorter sides of cross sections thereof overlapping one another.

With the above configuration, it is possible to reduce the circumferential width of the radially-inner in-slot portions 52 of the electric wires 50. Consequently, it is possible to accordingly reduce the circumferential width of the slots 34 of the radially inner portion 33 of the stator core 30, thereby increasing the circumferential width of the teeth of the radially inner portion 33. As a result, it is possible to improve the performance of the motor 1.

To compare the performance of the motor 1 according to the present embodiment with that of a conventional motor, both numerical analysis and test are conducted for each of the motor 1 and the conventional motor. It should be noted that the motor 1 includes no permanent magnet, whereas the conventional motor is a permanent magnet-type motor.

The results of the numeral analysis and test are shown in Table 1.

TABLE 1

|  | Motor 1 | Conventional Motor |
| --- | --- | --- |
| Overall Axial Length (mm) | 40 | 50 |
| Used Amount of Rare Earth Material (g) | 0 | 500 |
| Analysis Result (150Arms, 100° C.) | Torque 118 Nm/1000 rpm | Torque 113 Nm/1000 rpm |
| Test Result | Torque 111 Nm/1000 rpm | Torque 110 Nm/1000 rpm |

As seen from TABLE 1, the overall axial length of the motor 1 according to the present embodiment is reduced by 20% in comparison with that of the conventional motor. Moreover, unlike the conventional motor, the motor 1 according to the present embodiment includes no permanent magnet and thus no rare earth material is used in the motor 1. Consequently, the manufacturing cost of the motor 1 is reduced by at least 6,000 Japanese Yen in comparison with that of the conventional motor. Further, though the motor 1 according to the present embodiment includes no permanent magnet, it still can output more torque than the conventional motor.

[Second Embodiment]

Figure 12:
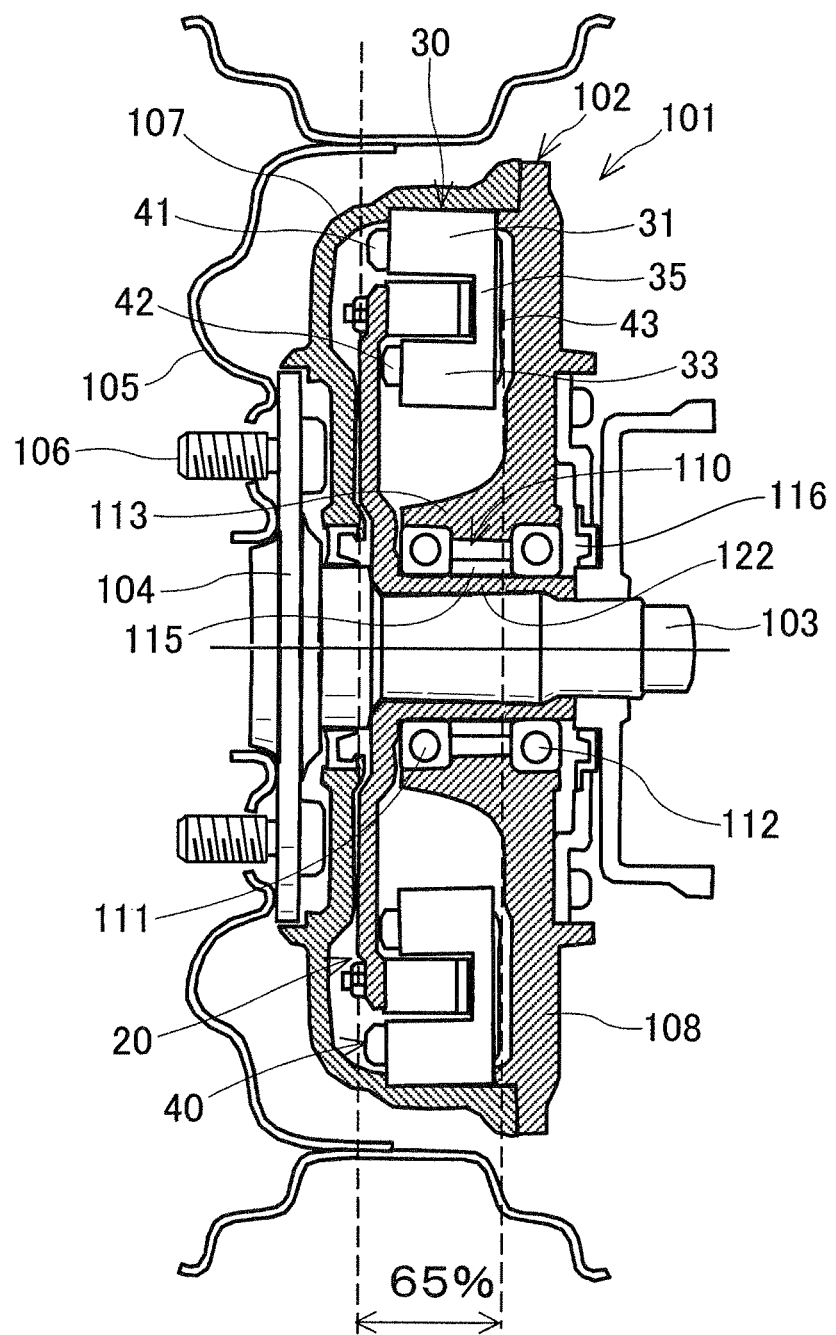
FIG. 12 is a schematic cross-sectional view of a multi-gap electric rotating machine according to a second embodiment of the invention.

FIG. 12 shows the overall configuration of a multi-gap electric rotating machine according to a second embodiment of the invention. In this embodiment, the multi-gap electric rotating machine is configured as an in-wheel motor 101 for an electric vehicle.

Specifically, as shown in FIG. 12, the in-wheel motor 101 includes a housing 102 and a rotating shaft 103. The housing 102 is mounted to the vehicle body via a suspension (not shown). The rotating shaft 103 has a hub 104 formed at one end (i.e., the left end in FIG. 12) thereof which protrudes outward from the housing 102. To the hub 104, there is fixed a wheel 105 by means of stud bolts 106.

The housing 102 is comprised of a substantially cup-shaped outer housing piece 107 and an inner housing piece 108. The inner housing piece 108 is fixed to the outer housing piece 107 by means of bolts (not shown) so as to cover the open end of the outer housing piece 107. Each of the outer and inner housing pieces 107 and 108 has an opening formed at the center thereof. The rotating shaft 103 is inserted in the housing 102 through the opening of the outer housing piece 107 and has the other end (i.e., the right end in FIG. 12) thereof protruding outside of the housing 102 through the opening of the inner housing piece 108.

The in-wheel motor 101 further includes a rotor 20, a bearing assembly 110, a stator core 30 and a stator coil 40, all of which are arranged within the housing 102. The rotor 20 includes a rotor core 22 and a shaft insertion portion 122. The rotor core 22, the stator core 30 and the stator coil 40 in this embodiment are respectively identical to those in the first embodiment. Therefore, only the bearing assembly 110 and the shaft insertion portion 122 of the rotor 20 will be described hereinafter.

The bearing assembly 110 is provided for rotatably supporting the rotating shaft 103. The bearing assembly 110 includes a pair of outer and inner ball bearings 111 and 112, a hollow cylindrical bearing case 113, and a pair of bearing collars 115 and 116. The bearing case 113 is integrally formed with the inner housing piece 108. The outer and inner ball bearings 111 and 112 and the bearing collar 115 are arranged within the bearing case 113, whereas the bearing collar 116 is located outside of the bearing case 113. The shaft insertion portion 122 of the rotor 20 is inserted in the outer and inner ball bearings 111 and 112, so that the rotor 20 is rotatably supported by the inner housing piece 108 via the ball bearings 111 and 112.

The rotating shaft 103 is inserted in the shaft insertion portion 122 of the rotor 20 and serration-fitted to the shaft insertion portion 122 so as to rotate therewith. Consequently, the rotor 20 and the rotating shaft 103 are together rotatably supported in the housing 102 via the bearing assembly 110. In addition, the outer and inner ball bearings 111 and 112 of the bearing assembly 110 are so arranged that both the center of gravity of the rotor 20 and the center of gravity of the rotating shaft 103 are axially positioned between the ball bearings 111 and 112.

The above-described n-wheel motor 101 according to the present embodiment has the same advantages as the engine direct-coupled motor 1 according to the first embodiment.

Figure 13:
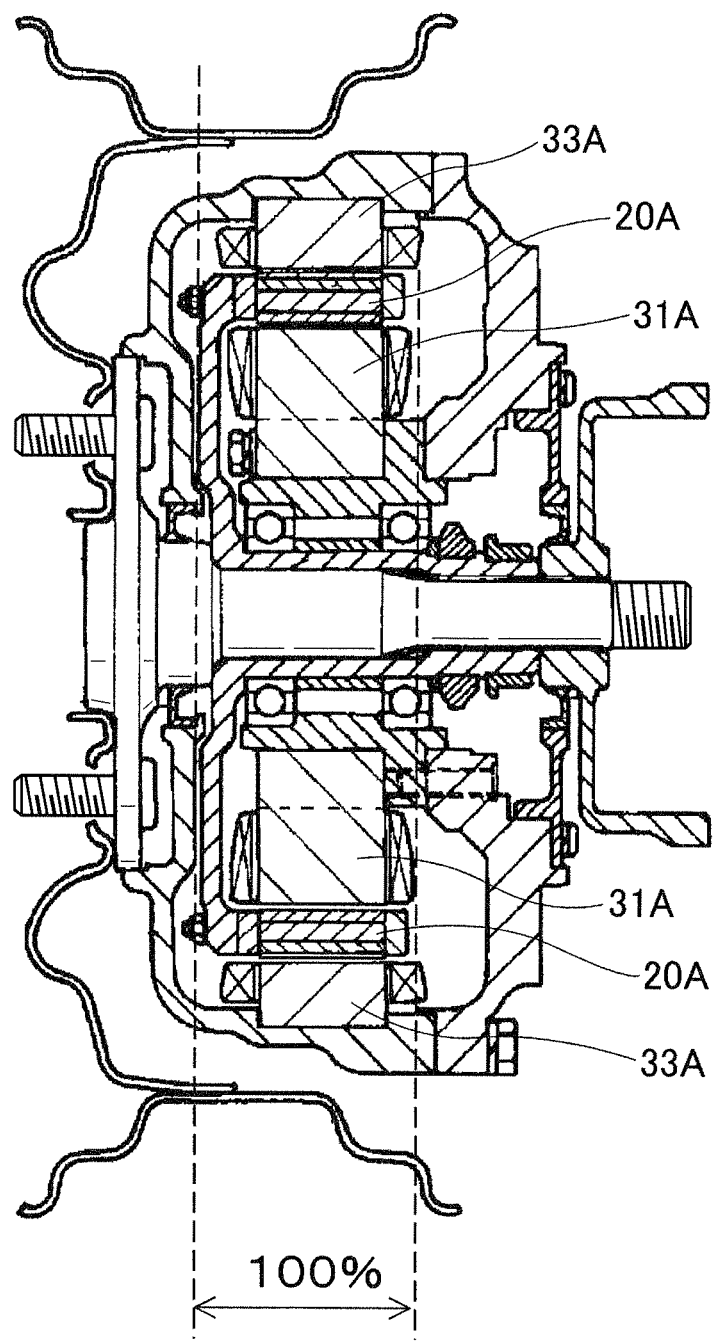
FIG. 13 is a schematic cross-sectional view of an in-wheel motor according to the prior art.

For example, as shown in FIGS. 12 and 13, the overall axial length of the in-wheel motor 101 according to the present embodiment is reduced by 35% in comparison with that of the in-wheel motor disclosed in Japanese Patent Application Publication No. 2007-282331.

In addition, since the in-wheel motor 101 includes only one stator coil (i.e., the stator coil 40), it is possible to reduce the weight of the in-wheel motor 101 and thus the overall weight of the wheel. Consequently, it is possible to improve the running performance of the wheel. Moreover, with the reduced overall axial length of the in-wheel motor 101, it is possible to provide an increased space available for installation of, for example, a disc brake. Consequently, it is possible to also improve the braking performance of the wheel.

[Third Embodiment]

In the previous embodiments, the rotor core 22 includes no permanent magnet. In comparison, a multi-gap electric rotating machine according to a third embodiment of the invention has a rotor core 220 that includes a plurality of permanent magnets 29.

Figure 14:
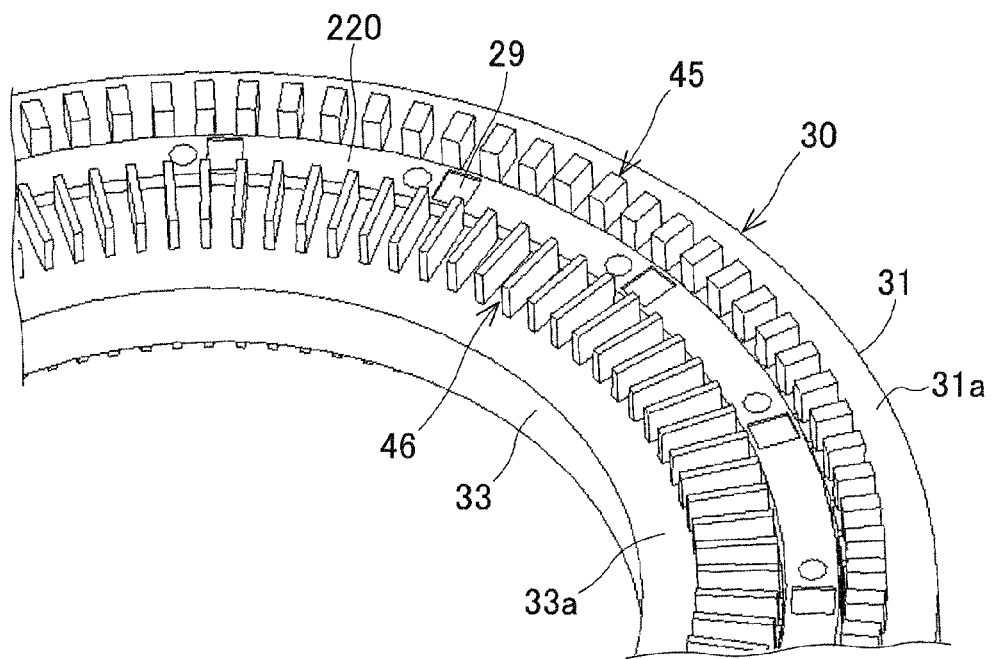
FIG. 14 is a perspective view of part of an assembly of a rotor core and a stator of a multi-gap electric rotating machine according to a third embodiment of the invention.
Figure 15:
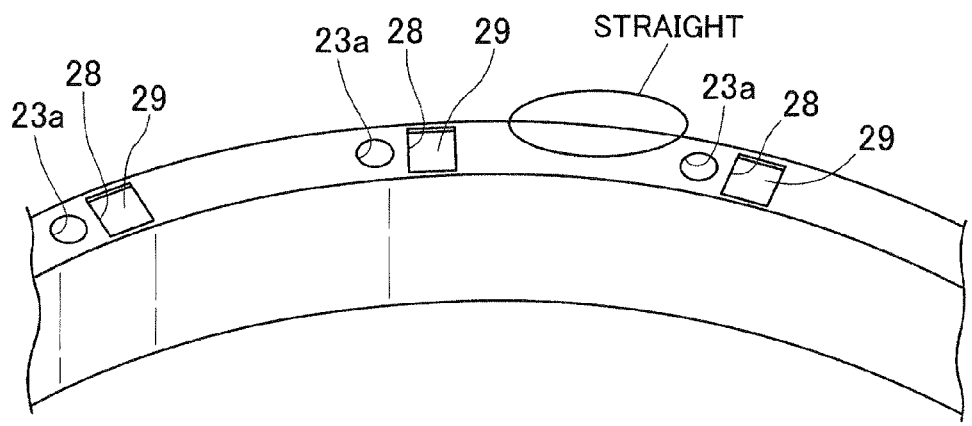
FIG. 15 is an enlarged perspective view of part of the rotor core of the multi-gap electric rotating machine according to the third embodiment.

Specifically, referring to FIGS. 14 and 15, in the present embodiment, the rotor core 220 has an annular shape and is made of a magnetic material. In the rotor core 220, there are formed a plurality of (e.g., 16) rectangular holes 28 that extend in the axial direction of the rotor core 220 to penetrate the rotor core 220 and are spaced in the circumferential direction of the rotor core 220 at equal intervals.

In each of the rectangular holes 28 of the rotor core 220, there is embedded a corresponding one of the permanent magnets 29. Further, the permanent magnets 29 are so arranged as to form a plurality of (e.g., 16) magnetic poles on each of the radially outer and inner peripheries of the rotor core 220; the polarities of the magnetic poles alternate between north and south in the circumferential direction of the rotor core 220. In addition, the permanent magnets 29 are made of a rare earth material.

Furthermore, in the present embodiment, the radially outer surface of the rotor core 220 includes a straight section between each circumferentially-adjacent pair of the permanent magnets 29. That is, the degree of recess of the radially outer surface of the rotor core 220 is reduced in comparison with that of the radially outer surface of the rotor core 22 in the previous embodiments. Moreover, for the rotor core 220 which has small outer and inner diameters, the contribution of the radially inner surface to generation of reluctance torque is small. Therefore, no recess is formed in the radially inner surface of the rotor core 220.

The multi-gap electric rotating machine according to the present embodiment has the same advantages as those according to the previous embodiments.

Moreover, compared to a conventional single-gap, permanent magnet-type electric rotating machine, the amount of the rare earth material used in the multi-gap electric rotating machine according to the present embodiment is reduced by half; the overall axial length of the multi-gap electric rotating machine is reduced by 25%.

Furthermore, in the present embodiment, the degree of recess of the radially outer surface of the rotor core 220 is reduced, thereby securing a large contribution of the permanent magnets 29 to the torque of the multi-gap electric rotating machine. In addition, if the degree of recess of the radially outer surface of the rotor core 220 is set to zero, it would be impossible to obtain reluctance torque. Therefore, in the present embodiment, the degree of recess of the radially outer surface is set to an optimal value by providing the straight sections in the radially outer surface.

While the above particular embodiments have been shown and described, it will be understood by those skilled in the art that various modifications, changes, and improvements may be made without departing from the spirit of the invention.

For example, in the previous embodiments, the stator core 30 is obtained by first forming the radially outer portion 31, the radially inner portion 33 and the connecting portion 35 separately by laminating the magnetic steel sheets and then joining them together into one piece. However, the stator core 30 may also be obtained by integrally forming all the portions 31, 33 and 35 of the stator core 30 together as, for example, a compressed power core or a sintered core.

Moreover, in the previous embodiments, the axial thicknesses of the rotor core 22 and the radially outer portion 31, radially inner portion 33 and connecting portion 35 of the stator core 30 are not described. However, those axial thicknesses may be set to their respective optimal values.

In addition, in terms of increasing the amount of magnetic flux transferred between the single rotor core 22 and the three portions 31, 33 and 35 of the stator core 30, it is preferable that the axial thickness of the rotor core 22 is set to be large.

However, referring again to FIG. 1, if the axial thickness of the rotor core 22 is set to be too large, the rotor disc 21 may protrude axially outside of the radially outer end portion 45 of the stator coil 40, thereby increasing the overall axial length of the multi-gap electric rotating machine. Accordingly, the axial thickness of the rotor core 22 is preferably set as large as possible to the extent that the rotor disc 21 does not protrude axially outside of the radially outer end portion 45 of the stator coil 40.

What is claimed is:

1. A multi-gap electric rotating machine, comprising:
a rotor including an annular rotor core;
a stator core having a radially outer portion, a radially inner portion and a connecting portion, the radially outer portion having an annular shape and being located radially outside of the rotor core with a radially outer magnetic gap formed between the radially outer portion and the rotor core, the radially outer portion having a plurality of slots that are formed in a radially inner surface of the radially outer portion and spaced in a circumferential direction of the radially outer portion, the radially inner portion having an annular shape and being located radially inside of the rotor core with a radially inner magnetic gap formed between the radially inner portion and the rotor core, the radially inner portion having a plurality of slots that are formed in a radially outer surface of the radially inner portion and spaced in a circumferential direction of the radially inner portion, the connecting portion radially extending to connect the radially outer and inner portions, the connecting portion being located on one axial side of the rotor core with an axial magnetic gap formed between the connecting portion and the rotor core, the connecting portion having a plurality of slots each of which is formed in an axial end face of the connecting portion facing the rotor core so as to communicate with a corresponding pair of the slots of the radially outer and radially inner portions; and
a stator coil formed of a plurality of electric wires mounted on the stator core, each of the electric wires having a plurality of radially-outer in-slot portions, a plurality of radially-inner in-slot portions and a plurality of radially-intermediate in-slot portions, each of the radially-outer in-slot portions being received in a corresponding one of the slots of the radially outer portion of the stator core, each of the radially-inner in-slot portions being received in a corresponding one of the slots of the radially inner portion of the stator core, each of the radially-intermediate in-slot portions being received in a corresponding one of the slots of the connecting portion of the stator core.

2. The multi-gap electric rotating machine as set forth in claim 1, wherein each of the rotor core and the stator core is made of a magnetic material.

3. The multi-gap electric rotating machine as set forth in claim 1, wherein the number of the slots of the radially outer portion of the stator core is equal to that of the slots of the radially inner portion of the stator core,
each of the slots of the radially outer portion is radially aligned with a corresponding one of the slots of the radially inner portion, and
each of the slots of the connecting portion of the stator core radially extends so as to communicate with the corresponding pair of the slots of the radially outer and radially inner portions which are radially aligned with each other.

4. The multi-gap electric rotating machine as set forth in claim 3, wherein each of the slots of the radially outer portion of the stator core axially extends so as to have an opening on an axial end face of the radially outer portion which is on the axially opposite side to the connecting portion of the stator core,
each of the slots of the radially inner portion of the stator core axially extends so as to have an opening on an axial end face of the radially inner portion which is on the axially opposite side to the connecting portion of the stator core, and
the electric wires forming the stator coil are mounted to the stator core by axially moving the electric wires toward the stator core from the opposite side to the connecting portion until the radially-outer in-slot portions, radially-inner in-slot portions and radially-intermediate in-slot portions of the electric wires are respectively inserted in the slots of the radially outer portion, the slots of the radially inner portion and the slots of the connecting portion of the stator core.

5. The multi-gap electric rotating machine as set forth in claim 1, wherein each of the electric wires forming the stator coil further has a plurality of radially-outer turn portions and a plurality of radially-inner turn portions,
each of the radially-outer turn portions is located outside of the slots of the radially outer portion of the stator core and connects a corresponding adjacent pair of the radially-outer in-slot portions of the electric wire, and
each of the radially-inner turn portions is located outside of the slots of the radially inner portion of the stator core and connects a corresponding adjacent pair of the radially-inner in-slot portions of the electric wire.

6. The multi-gap electric rotating machine as set forth in claim 1, wherein each of the electric wires forming the stator coil has a rectangular cross section perpendicular to a longitudinal direction thereof.

7. The multi-gap electric rotating machine as set forth in claim 6, wherein each of the radially-intermediate in-slot portions of the electric wires forming the stator coil radially extends between the radially outer portion and radially inner portion of the stator core and is twisted at its radial center by 90°,
in each of the slots of the radially outer portion of the stator core, a predetermined number of the radially-outer in-slot portions of the electric wires are radially stacked with the longer sides of cross sections thereof overlapping one another, and
in each of the slots of the radially inner portion of the stator core, a predetermined number of the radially-inner in-slot portions of the electric wires are radially stacked with the shorter sides of cross sections thereof overlapping one another.

8. The multi-gap electric rotating machine as set forth in claim 1, wherein the multi-gap electric rotating machine is configured as an engine direct-coupled motor that is arranged between an engine and a transmission in a hybrid vehicle.

9. The multi-gap electric rotating machine as set forth in claim 1, wherein the multi-gap electric rotating machine is configured as an in-wheel motor for an electric vehicle.

10. The multi-gap electronic rotating machine as set forth in claim 1, wherein the plurality of electric wires form a single stator coil.

11. The multi-gap electronic rotating machine as set forth in claim 1, wherein the stator core has a one-piece structure.

12. The multi-gap electronic rotating machine as set forth in claim 1, wherein the number of magnetic gaps formed between the rotor core and the stator core is three.

* * * * *